Patented Dec. 22, 1953

2,663,722

UNITED STATES PATENT OFFICE 2,663,722

METHOD OF PREPARING TETRAALKYL DITHIONOPYROPHOSPHATES

Arthur Dock Fon Toy, Park Forest, Ill., assignor to Victor Chemical Works, an Illinois corporation No Drawing. Application March 24, 1950, Serial No. 151,817

17 Claims. (Cl. 260—461)

This invention relates to a process of making tetraalkyl dithionopyrophosphates and to the new compounds, the tetrapropyl dithionopyrophosphates.

This application is a continuation-in-part of my copending application, Serial No. 35,978, filed June 29, 1948, now abandoned.

The tetraalkyl dithionopyrophosphates containing 2 or more carbon atoms in the alkyl group may be produced by reacting a dialkyl chlorothionophosphate with water and a tertiary amine, such as pyridine. Where only these reactants are employed, the equation for the reaction is as follows, using pyridine as the amine:

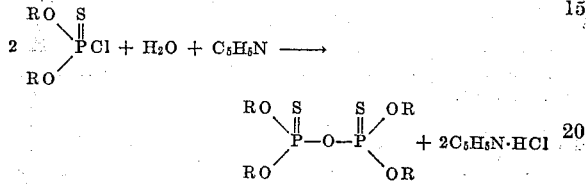

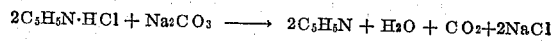

in which R is an alkyl group having 2 or more carbon atoms. Other tertiary amines, such as triethylamine, alpha-picoline, or the like may be substitiuted for the pyridine in the above equation if desired. The results, however, are not quite as satisfactory from a commercial view as when pyridine is used, as the resulting esters are somewhat less toxic towards insects and rodents and the yields are lower.

With pyridine as the condensation agent, the reaction proceeds most efficiently at temperatures between 25° C. and 80° C. Other temperatures may be used but at temperatures below 25° C. the reaction is too slow for commercial operation and at temperatures above 80° C. the yields are reduced and the quality of the product is reduced. A preferred temperature range of 30° to 50° is desirable especially when pyridine is used as one of the reactants.

The amounts of water and pyridine or other amine employed should be at least equal to that theoretically required for the above equation. An excess of either or both reagents is not greatly detrimental to either the yield or purity of the product. For example, in the preparation of tetraethyl dithionopyrophosphate an excess of 20% pyridine was used, and the product recovered in an 81% yield. Also an excess of 400% water, using normal amounts of pyridine, resulted in an 85% product yield. In another example 100% excess of both amine and water were used, and a good yield (74%) was obtained. Furthermore, by modification of the process to also include inorganic bases, such as $NaHCO_3$, $Na_2CO_3$ and $NaOH$, and the like, only catalytic amounts of pyridine and water are needed. Where a base is used with catalytic amounts of an amine, such as pyridine, which is used with water, the mechanism of the reaction appears to be as follows:

The pyridine or other amine and water react in theoretical portions with part of the dialkyl chlorothionophosphate to give tetraalkyl dithionopyrophosphate and pyridine hydrochloride. The pyridine hydrochloride immediately reacts with the inorganic base to regenerate pyridine and water which react with a further portion of the dialkyl chlorothionophosphate. These reactions are illustrated in the following equations:

(a)

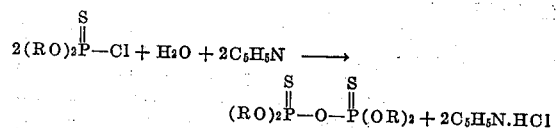

(b)

$2C_5H_5N \cdot HCl + Na_2CO_3 \longrightarrow 2C_5H_5N + H_2O + CO_2 + 2NaCl$

Very small amounts of pyridine or other amine will suffice to promote the reaction, but for practical purposes, it is generally preferred to employ not less than 5% by weight of the theoretical amount for commercial production.

While pyridine is the preferred catalyst, it is possible to employ tertiary amines such as alpha-picoline and triethyl amine with a limited degree of success where low yields and quality of the product are not objectionable. The reaction may be carried out in the presence of an inert solvent, if desired, or may be carried out without the aid of a solvent.

The tetraalkyl dithionopyrophosphate esters containing 2 or more carbon atoms in the alkyl groups are relatively water insoluble. The pure esters will not hydrolyze in water. Commercially prepared esters tend to hydrolyze to varying extents, depending upon the amounts of impurities present. The extent of this hydrolysis is not over 10% as a maximum.

The tetraethyl dithionopyrophosphate ester, as disclosed in my copending application Serial No. 35,978 has been found to be effective as an insecticide which may be used in low concentrations, and will maintain its effectiveness for long periods of time after application. The tetrapropyl dithionopyrophosphate esters are new compounds that possess the unusual characteristic of being relatively non-toxic to warm blooded animals and yet highly toxic to insects. The disadvantage of many of the newer organic phosphate insecticides has been that while they are highly toxic to insects they are also very toxic to warm blooded animals and man. Extreme care has been necessary in the manufacture and use of such insecticides.

I have compiled the toxicities with respect to warm blooded animals of various organic insecticides, including the normal and iso-propyl tetraalkyl dithionopyrophosphate esters of this invention. The toxicities are given in minimum lethal dose (milligrams per kilogram body weight) to cause 50% kill of male white mice subjected to intraperitoneal injection of the toxic material, as shown in Table I.

TABLE I

| Compound | $LD_{50}$ |
|---|---|
| Tetraethyl pyrophosphate | 0.82 |
| Diethyl p-nitrophenyl thionophosphate (Parathion) | 8.0 |
| Diethyl p-nitrophenyl phosphate | 2.0 |
| Tetraethyl dithionopyrophosphate | 8.0 |
| Tetra-n-propyl dithionopyrophosphate | >8,500 |
| Tetra i-propyl dithionopyrophosphate | 7,500 |

The insecticidal qualities of the new tetrapropyl compounds were investigated and found to be effective at low concentrations. Tests were carried out by dipping oranges in dilute acetone solutions of various organic phosphate insecticides, including the tetra n-propyl dithionopyrophosphate ester, for one second and dried for 15 minutes and then infesting the oranges with thrips, red mites, scale, and the like. Comparative results of tetra n-propyl dithionopyrophosphate and other organic insecticides are shown in Table II.

TABLE II

| Insect | Percent ester (by vol.) in acetone | Percent mortality of insect | | | |
|---|---|---|---|---|---|
| | | Parathion | Tetraethyl pyrophosphate | Tetraethyl dithionopyrophosphate | Tetra n-propyl dithionopyrophosphate |
| Greenhouse thrips | 0.1 | 100 | 100 | 100 | 100 |
| | 0.01 | 100 | 100 | 100 | 100 |
| | 0.001 | 100 | 90 | 100 | 2 |
| Red mite | 0.1 | 100 | 100 | 100 | 100 |
| | 0.01 | 90 | 99 | 99 | 33 |
| | 0.001 | 46 | 75 | 70 | |
| Red mite egg | 0.25 | 100 | | | 97 |
| | 0.1 | 100 | | | |
| Scale | 0.25 | 100 | | | 73 |
| | 0.025 | 96 | | 71 | |

Tests have been conducted with the tetraisopropyl dithionopyrophosphate ester in respect to its action as a choline esterase inhibitor. Choline esterase is an enzyme found in nerves, muscle and brain tissue, a function of which is to hydrolyze acetylcholine in the same tissues. If the hydrolysis is carried out in a buffer solution containing sodium bicarbonate, the acetic acid formed upon hydrolysis will release $CO_2$ from the bicarbonate, the quantity of $CO_2$ released being readily measurable. Certain toxic organic phosphorus compounds are known to inhibit the hydrolyzing action of the choline esterase enzyme, hence similar tests may be made by measuring the amount of $CO_2$ released from a buffer solution in which the hydrolysis of acetyl choline has been modified by addition of toxic materials. Comparisons may then be made as to the quantity of toxic material of various insecticides which will inhibit the choline esterase enzyme activity to the extent of 50%.

Fly, bee and mouse brain tissues were individually subjected to inhibition tests with tetraisopropyl dithionopyrophosphate and commercial parathion. These tests tend to show that the isopropyl ester has a selective toxic action, being very toxic to house flies but considerably less toxic to bees and animals. In Table III there is presented data on the choline esterase inhibition obtained from tests as described above. Comparative results are given for tetraisopropyl dithionopyrophosphate and parathion.

TABLE III

Molar concentration for 50% Ch. E. inhibition

| Compound | Mouse | Bee | Fly |
|---|---|---|---|
| Parathion | $1.2 \times 10^{-6}$ | $1 \times 10^{-6}$ | $4.5 \times 10^{-7}$ |
| Tetraisopropyl dithionopyrophosphate | $2 \times 10^{-3}$ | $2 \times 10^{-3}$ | $4 \times 10^{-6}$ |

Whereas in the case of parathion the molar concentration increase for similar effects on mouse and bee brain as on fly brain is approximately 2½ times, in the case of the isopropyl ester of this invention it is 500 times.

The important advantage of such selective toxic action is readily recognized. Hence it will be seen that the new compounds, the tetra normal and isopropyl dithionopyrophosphates are very unusual compounds showing very little toxicity to warm blooded animals, and yet being toxic to most insects and pests at low concentrations, in contrast to the next lower homologue, tetraethyl dithionopyrophosphate which is very toxic to warm blooded animals, and the next higher homologue tetrabutyl dithionopyrophosphate which does not have sufficient toxicity to insects.

EXAMPLE 1

103.8 g. (0.55 mole) of diethyl chlorothionophosphate (($C_2H_5O$)$_2$PSCl) was dissolved in 150 cc. of ethyl ether in a reaction flask equipped with a reflux condenser. To this solution was added a mixture of 43.5 g. (0.55 mole) of pyridine and 4.97 g. (0.276 mole) of water in 75 cc. of ethyl ether. No reaction occurred at 0° C. The mixture was heated under reflux conditions at 40°–45° C. for 7.5 hours, then cooled to room temperature and the pyridine hydrochloride formed by the reaction removed by filtration. The filtrate was then heated under reduced pressure to distill off the ether and unreacted diethyl chlorothionophosphate. The remaining tetraethyl dithionopyrophosphate had a boiling point of 125–128° C. at 0.5 to 1.0 mm. Hg pressure. The yield was 40 g. The ester was further purified by redistillation to give a product having a refractive index $N_D^{25} = 1.4753$, and a boiling point of 110–113° C. at .2 mm. Hg pressure, and a specific gravity of 1.185 at 25° C. Analysis of the compound showed 19.3% P and 20.2% S as compared to theoretical values of 19.3% P and 19.9% S. The toxicity to white mice was $LD_{50} = 7.7$ mg./kg. Hydrolysis tests showed the compound to be highly stable. One gram in a large volume of water after 48 hours showed acidity equivalent to 1.2 cc. N/10 NaOH. After 96 hours the acidity was still the same.

EXAMPLE 2

The tetraethyl dithionopyrophosphate was prepared without the aid of a solvent reaction medium in the following manner: 126 g. (0.67 mole) of diethyl chlorothionophosphate having a refractive index of $N_D^{25} = 1.4695$ was placed in a reaction vessel and 52.8 g. (0.67 mole) of pyridine and 6 g. (0.33 mole) of water were added at 32°–35° C. The reaction temperature rose to about 48° C. After the exothermic reaction ceased, the mixture was heated to 43° to 45° C. for one hour and then allowed to come to room temperature. 50 cc. of water was added and the oily ester layer separated from the aqueous pyridine hydrochloride solution. The oily layer was then heated at less than 2 mm. pressure to distill off the pure ester compound which had a boiling point of 122° C. (at 0.5 to 1 mm. Hg), and a refractive index of $N_D^{25}=1.4753$. The yield of the pure ester was 88 grams or 81.5% of theoretical. Analysis showed 19.3% P and 19.8% S.

EXAMPLE 3

75.4 g. (0.4 mole) of diethyl chlorothionophosphate was placed in a reaction vessel and 32.6 g. (0.413 mole, 3.2% excess) of pyridine and 3.8 g. (0.21 mole, 5% excess) of water added. The reaction temperature was held at 37° to 40° C. for two hours. The product was cooled to room temperature and washed once with 30 cc. of water, and three times with 30 cc. portions of water and 5 cc. portions of sodium chloride solution. The oily layer was separated and heated to 100° C. at 1.5 mm. Hg. Approximately 1.7 grams of unreacted diethyl chlorothionophosphate distilled over. The residue weighed 56.2 g. and represented a yield of 87.3% of substantially pure tetraethyl dithionopyrophosphate. Hydrolysis tests showed acidity equivalent to 2.5 cc. N/10 NaOH per gram after 72 and 120 hours respectively.

EXAMPLE 4

Example 3 was repeated except that the reaction temperature was held at 60° C. for two hours. The yield of the ester product was 51.9 g. or 80.6% of theoretical. The product had a refractive index of $N_D^{25}=1.4808$. Hydrolysis tests showed acidity equivalent to 2.5 cc. of N/10 NaOH in 48 hours and 3.0 cc. in 120 hours, indicating a slightly less pure product resulting from the higher reaction temperature employed.

EXAMPLE 5

75.4 g. (0.4 mole) of diethyl chlorothionophosphate was placed in a reaction vessel and a mixture of 4 g. (0.222 mole or 11% excess) of water and 39 g. (0.42 mole or 5% excess) of alpha-picoline was added. The reaction temperature was maintained at 49–50° C. by periodic cooling until the decrease in the exothermic reaction permitted the temperature to drop. The mixture was then heated at 50° C. for one hour. After cooling to room temperature, 35 cc. of water was added and the oily layer separated, and heated to 130° C. for 2 or 3 minutes. About 6 g. of distillate came over and was discarded. The residual liquid which was an impure tetraethyl dithionopyrophosphate ester weighed 46 grams representing a 71.5% yield of the crude product. Hydrolysis tests showed development of acidity equivalent to 9.2 cc. of N/10 NaOH immediately, 16.5 cc. after 48 hours and 17.3 cc. after 120 hours.

These data show that some decomposition of the ester product had taken place and that the use of alpha-picoline in the process is not completely satisfactory from a commercial viewpoint.

The process was repeated using triethyl amine as the amine reactant instead of the preferred pyridine. The resulting ester product was of the same general character as that obtained in the above example where alpha-picoline was employed.

EXAMPLE 6

To 108.2 g. (0.5 mole) of di-iso-propyl thionochlorophosphate was added a mixture consisting of 4.6 g. (0.255 mole) water and 40.7 g. (0.515 mol) pyridine, the temperature being maintained at 36–38° C. The reactants were added in twenty minutes. After 3 hours the temperature dropped to 30° C. It was heated to 36–38° C. for two hours and allowed to stand overnight. 100 cc. of water was added, the organic layer separated and washed 4 times with 75 cc. of water. The crude product was then heated to 110° C. at 0.5 mm. to remove unreacted $(i-C_3H_7O)_2PSCl$. The residue weighed 73 g., representing a 77.5% yield and having a refractive index of 1.4633 and a phosphorus content of 16.4%. The crude material was 0% hydrolyzed in one day and 0.4% hydrolyzed after five days. When distilled the product had a refractive index of 1.4620 and a specific gravity of 1.093 at 25°/4.

EXAMPLE 7

To 216.5 g. (1 mol) of di-n-propyl chlorothionophosphate was added a mixture of 81.4 g. (1.03 mol) pyridine and 9.3 g. (0.515 mol) water. The temperature was maintained at 36–38° C. by periodic cooling. The mixture was stirred overnight and 150 cc. water added. The oily layer was separated and washed four times with 50 cc. of water each. It was heated to 110° C. under less than 1 mm. to remove unreacted

$(n-C_3H_7O)_2PSCl$

The residue weighed 161 g. (81% yield), had a refractive index of 1.4681 and an analysis of 16.7% P. 16.8% S. 2.2% was hydrolyzed in one day and 4.3% in 4 days. The toxicity was 9,500 mg./kg. The material is distillable.

EXAMPLE 8

To 203.5 g. (1 mol) of di-n-butyl chlorothionopyrophosphate was added a mixture of 9.45 g. (0.525 mol) water and 81.4 g. (0.5 mol) pyridine. The temperature was kept at 34 to 36° C. for several hours. Upon completion of the reaction, the mixture was washed with water. The oily layer was separated, and excess reactants removed therefrom by distillation under vacuum. The crude product weighed 196 g. representing a 96.5% yield with a refractive index of 1.4692.

The above examples illustrate how tetraalkyl dithionopyrophosphate may be prepared by reacting dialkyl chlorothionophosphate with water and pyridine in substantially stoichiometric proportions. As has been pointed out above, however, the amount of amine, such as pyridine, may be reduced to only catalytic proportions if an inorganic base, such as sodium bicarbonate, caustic soda, or the like, is employed with the water and amine. The inorganic base serves to regenerate the amine, such as pyridine, from pyridine hydrochloride reaction product. The regenerated amine immediately enters into reaction with further portions of the dialkyl chlorothionophosphate. The following examples illustrate the use of catalytic proportions of the amine together with an inorganic base.

EXAMPLE 9

To 75.4 g. (0.4 mole) of diethyl chlorothionophosphate $((C_2H_5O)_2PSCl)$ was added a mixture of 7.6 grams water and 3.46 grams (0.044 mole) of pyridine. After the mixture had been stirred for about 12 minutes, 41.4 grams of sodium bicarbonate was added in small portions. The reaction temperature was around 29°–32° C. After half of the sodium bicarbonate was added 7.2 cc. of water was added. Upon completing the addition of the sodium bicarbonate, the mixture was allowed to stand with stirring until the reaction temperature reached a maximum of about 36° C. The mixture was then heated to 40° C. for one hour, after which the unreacted NaHCO$_3$ and NaCl (formed in the reaction) were removed by washing with water. The oily layer was separated and heated to 100° C. at 1 mm. Hg pressure to distill off the unreacted (EtO)$_2$PSCl. The residual liquid was a substantially pure tetraethyl dithionopyrophosphate having an index of refraction of $N_D^{25}=1.4760$. The product weighed 52 grams and represented a yield of 81%. Only 11% of the theoretical amount of pyridine was employed in this sample.

EXAMPLE 10

This example was carried out in substantially the same manner as the preceding example except that a much smaller amount of pyridine was employed; it being only 5.5% of the theoretical amount.

75.4 g. (0.4 mole) of (C$_2$H$_5$O)$_2$PSCl, 1.68 g. (0.02 mole) of pyridine, and 3.6 cc. of water were mixed. 41.4 g. of sodium bicarbonate was added slowly. The reaction was quite slow so an additional 7.2 cc. of water was added and the mixture was allowed to stand at room temperature for about three days. The mixture was then washed with water and the oily layer separated. The oily product was then heated to 105° C. at 1 mm. Hg pressure to distill off the unreacted (C$_2$H$_5$O)$_2$PSCl The residual tetraethyl dithionopyrophosphate product weighed 48 g. representing a yield of 74.5%. The actual yield was 82.6% when based on the amount of reacted (C$_2$H$_5$O)$_2$PSCl. The ester product had an index of refraction of $N_D^{25}=1.4758$, and a toxicity to white mice of 7.5 mg./kg. (LD50).

EXAMPLE 11

To 259.8 g. (1.2 mole) of di-n-propyl chlorothionophosphate was added slowly a mixture consisting of 6 g. (0.3 mole) of water and 10.2 g. (0.13 mole) of pyridine. The mixture was stirred for twenty minutes during which time a maximum temperature of 37.5° C. was reached. The mixture was cooled to 22° C. and 69.9 g. (0.66 mole) of Na$_2$CO$_3$ was added and then 120 cc. water. The temperature rose to 39° C. and was maintained at 36–39° C. for several hours. After 2½ hours CO$_2$ was evolved. Upon completion of the reaction the product was washed with water. Excess reactants were removed by distillation under vacuum. The crude product weighed 212 g. (93.4% yield), and had a refractive index of 1.4712. The product analyzed 16.3% P, and 17.0% S. Approximately 4.0% hydrolyzed in one day and 6.4% in three days. The crude product was distilled yielding material with a refractive index of 1.4720 at 25° C.

EXAMPLE 12

75.4 g. (0.4 mole) of (C$_2$H$_5$O)$_2$PSCl, 3.6 g. (10% of theoretical) alpha-picoline and 14.2 cc. of water were stirred together and 41.4 grams of sodium bicarbonate added. Very little reaction heat was developed. After allowing the mixture to stand at room temperature for two days the oily layer was separated and heated under vacuum to distill off the unreacted (C$_2$H$_5$O)$_2$PSCl. 72.5% of unreacted (C$_2$H$_5$O)$_2$PSCl was recovered. The residual ester product weighed 8.4 g. representing a yield of about 13%. The product was a crude tetraethyl dithionopyrophosphate having an index of refraction of $N_D^{25}=1.4809$.

This example shows that alpha-picoline is not as satisfactory as pyridine for catalytic use in the process.

In another test triethyl amine was used as the catalyst and caustic soda as the base. While a reaction took place, the yield and quality of the ester product were too low for satisfactory commercial production.

EXAMPLE 13

75.4 g. of (C$_2$H$_5$O)$_2$PSCl, 3.5 cc. of pyridine (11% of theoretical), and 7.6 cc. of water were stirred together for about 15 minutes and 35.2 cc. of a 50% NaOH solution slowly added with periodic cooling to keep the reaction temperature at about 30°–32° C. After the addition of the caustic soda was completed, the mixture was stirred at room temperature for 2¼ hours, and then washed with water. The oily layer was separated and heated to 100° C. at ½ mm. Hg pressure to remove any unreacted (C$_2$H$_5$O)$_2$PSCl. The residual product weighed 33.2 g. representing a yield of 51.5% of a substantially pure tetraethyl dithionopyrophosphate, having an index of refraction of $N_D^{25}=1.4770$.

EXAMPLE 14

75.4 grams of (C$_2$H$_5$O)$_2$PSCl, 3.4 cc. of pyridine (10% of theoretical) and 2 cc. of water were thoroughly mixed, after which 23.3 grams sodium carbonate (Na$_2$CO$_3$) and 40 cc. of water were added. Periodic cooling at first, and heating later were used to maintain a reaction temperature of 38°–40° C. After stirring for about 3 hours, the evolution of CO$_2$ gas ceased and the mixture was heated an additional 30 minutes to insure completion of the reaction. The mixture was cooled to room temperature and 50 cc. of water added. The oily layer was separated and heated to 105° C. at 1–5 mm. Hg pressure to evaporate off unreacted (C$_2$H$_5$O)$_2$PSCl. The residual, substantially pure tetraethyl dithionopyrophosphate weighed 56.5 grams or a yield of 87.7%. It had an index of refraction of $N_D^{25}=1.4768$.

EXAMPLE 15

The preceding example was repeated except that the amount of pyridine was reduced to 5% of the theoretical amount. The rate of reaction was somewhat slower than in Example 14. After allowing the mixture to stand overnight, water was added and the oily layer separated. After distilling off the unreacted (C$_2$H$_5$O)$_2$PSCl, the residual ester product weighed 54 g. representing a yield of 84%. It had an index of refraction of $N_D^{25}=1.4760$.

The above series of examples show that dialkyl chlorothionophosphate may be reacted with water and an amine such as pyridine in stoichiometric proportions or with water, an inorganic base and catalytic amounts of pyridine to produce a high yield of good quality tetraethyl dithionopyrophosphate ester. Without the aid of an inorganic base, smaller than theoretical amounts of pyridine will result in lower yields of the ester products proportional to the amount of pyridine and water employed.

The hydrolysis tests or rates given in the above examples refer to rates of hydrolysis when a sample of the ester is maintained in continual contact with water, as by agitation, for a given period of time.

In use for insecticidal purposes the ester product need not be purified by redistillation since the crude undistilled product is sufficiently toxic to insects and rodents for commercial purposes. The material, however, made by the above processes involving the use of pyridine alone or pyridine and inorganic bases is distillable.

The ester products of this invention may be employed with carriers and diluents. The products may be employed in the form of dilute solvent solutions, aqueous emulsions, or absorbed in inert dusting powders, and may be applied by spraying, dusting, or other means to the infected areas, plants, fruit and the like.

Having described my invention in considerable detail together with several examples of the same, it is my intention that the invention be not limited by any of the details of description unless otherwise specified, but rather be construed broadly within its spirit and scope as set out in the accompanying claims.

I claim:

1. The method of preparing a tetraalkyl dithionopyrophosphate ester which comprises reacting a dialkyl chlorothionophosphate with water and a tertiary amine at a temperature below 80° C. but above 0° C. for a period of time sufficient to complete the reaction, and separating the oily product.

2. The method of claim 1 wherein the alkyl groups of the dialkyl chlorothionophosphate each contain at least two carbon atoms.

3. The method of claim 2 wherein the product is washed with water and the oily product is then separated.

4. The method of claim 1 wherein the dialkyl chlorothionophosphate is a member of the class consisting of diethyl, di-i-propyl, di-n-propyl and di-n-butyl chlorothionophosphates.

5. The method of preparing a tetraalkyl dithionopyrophosphate ester which comprises reacting a dialkyl chlorothionophosphate with water and a pyridine at a temperature below 80° C. but above 0° C. for a period of time sufficient to complete the reaction, and separating the oily product.

6. The method of claim 5 wherein at least two molar proportions of pyridine and one molar proportion of water are employed per two molar proportions of dialkyl chlorothionophosphate.

7. The method of claim 5 wherein the temperature is about 30 to 50° C.

8. The method of claim 5 wherein the product is washed with water and the oily product is then separated.

9. The method of preparing a tetraalkyl dithionopyrophosphate ester which comprises reacting a dialkyl chlorothionophosphate containing at least two carbon atoms in each alkyl group with water and an amount of pyridine that is less than the theoretical reactive amount thereof at a temperature between 25 and 80° C. for a period of time sufficient to complete substantially the reaction, and separating the oily liquid product, said reaction taking place in the presence of an inorganic base.

10. The method of claim 9 wherein the product is washed with water and the oily product is then separated.

11. The method of claim 10 wherein the amount of the inorganic base is sufficient to combine with the chlorine of the dialkyl chlorothionophosphate.

12. The method of claim 10 wherein the pyridine is not less than from 5 to 10% by weight of the stoichiometric amount.

13. The method of claim 10 wherein the inorganic base is sodium bicarbonate.

14. The method of claim 10 wherein the inorganic base is sodium carbonate.

15. The new compounds: tetrapropyl dithionopyrophosphates.

16. The new compound: tetra-i-propyl dithionopyrophosphate.

17. The new compound: tetra-n-propyl dithionopyrophosphate.

ARTHUR DOCK FON TOY.

References Cited in the file of this patent

UNITED STATES PATENTS

| Number | Name | Date |
|---|---|---|
| 2,063,629 | Salzberg et al. | Dec. 8, 1936 |
| 2,133,310 | Shuman | Oct. 18, 1938 |
| 2,408,744 | Engel | Oct. 8, 1946 |
| 2,471,464 | Toy et al. | May 31, 1949 |
| 2,479,939 | Kosolapoff | Aug. 23, 1949 |

OTHER REFERENCES

Ludvik et al., Journal of Econ. Entom., vol. 40, 1947, page 99.